(12) United States Patent
Yamashita et al.

(10) Patent No.: US 6,893,374 B2
(45) Date of Patent: May 17, 2005

(54) PLANETARY GEAR APPARATUS

(75) Inventors: Yozo Yamashita, Higashimatsuyama (JP); Shinichiro Nakajima, Shiki (JP); Makoto Nishiji, Kumagaya (JP)

(73) Assignee: Bosch Automotive Systems Corporation, Tokyo (JP)

( * ) Notice: Subject to any disclaimer, the term of this patent is extended or adjusted under 35 U.S.C. 154(b) by 0 days.

(21) Appl. No.: 10/625,393

(22) Filed: Jul. 23, 2003

(65) Prior Publication Data

US 2004/0127324 A1 Jul. 1, 2004

(30) Foreign Application Priority Data

Jul. 25, 2002 (JP) ........................................ 2002-216605

(51) Int. Cl.[7] .............................................. F16H 57/08
(52) U.S. Cl. ........................................................ 475/331
(58) Field of Search ........................................... 475/331

(56) References Cited

U.S. PATENT DOCUMENTS 1,644,222 A * 10/1927 Baker .......................... 475/344

FOREIGN PATENT DOCUMENTS

| JP | H04-312247 | 4/1992 |
| JP | H09-112657 | 2/1997 |
| JP | H09-144844 | 3/1997 |

* cited by examiner

Primary Examiner—Dirk Wright
(74) Attorney, Agent, or Firm—Thomas B. Ryan, Esq.; Brian B. Shaw, Esq.; Harter, Secrest & Emery LLP (57) ABSTRACT

Five receiving holes 2e extending along the axis of a circular cylindrical portion 2b of a housing are formed in the circular cylindrical portion 2b. Those five receiving holes 2e are arranged at equal intervals in the peripheral direction of the circular cylindrical portion 2b. Each receiving hole 2e rotatably receives therein a planetary gear 5. The respective planetary gears 5 are in engagement with an inner gear 3 and a sun gear 4. The teeth of the inner gear 3, the sun gear 4 and the planetary gears 5 are helical teeth. The numbers of teeth of the inner gear 3, the sun gear 4 and the planetary gears 5 are set to 36, 24 and 6, respectively. As a result, the numbers of teeth of the inner gear 3 and the sun gear 4 located between adjacent two planetary gears 5 in the peripheral direction become 7.2 and 4.8, respectively, which are values each having a fraction below the decimal point.

4 Claims, 8 Drawing Sheets

PLANETARY GEAR APPARATUS

BACKGROUND OF THE INVENTION

This invention relates to a planetary gear apparatus including an inner gear, planetary gears and a sun gear.

In general, the planetary gear apparatus includes an inner gear and a sun gear whose axes are aligned with the rotation axis, a carrier rotatable about the rotation axis, and a planetary gear rotatably received in receiving a hole formed in the carrier. The planetary gear is in engagement with the inner gear and the sun gear. Accordingly, when the carrier, for example, is driven for rotation, its rotation is transmitted to the inner gear and the sun gear through the planetary gear. In this case, when the planetary gear is rotated about its own axis, the inner gear and the sun gear are differentially rotated. When the planetary gear is not rotated about its own axis, the inner gear, the carrier, the planetary gear and the sun gear are integrally rotated (see Japanese Patent Application Laid-Open Nos. H04-312247, H09-112657 and H09-144844).

In the above-mentioned planetary gear apparatus, when the planetary gear is rotated about its own axis at the time of differential rotation, a friction resistance (friction torque) for stopping the rotation of the planetary gear is generated between the outer peripheral surface of the planetary gear and the inner peripheral surface of the receiving hole. Moreover, since the inner gear, the planetary gear and the sun gear have helical teeth, a thrust force acts on the area between the inner gear and the planetary gear and between the sun gear and the planetary gear. By this thrust force, the inner gear and the sun gear are pushed in the axial direction so that their end faces are abutted with a housing of the planetary gear apparatus and the end face of the planetary gear is abutted with the bottom surface of the receiving hole. As a result, a friction torque for stopping the rotation of the inner gear, the sun gear and the planetary gear is generated at the respective end faces of those gears. By this friction torque, the differential rotation between the inner gear and the sun gear is limited. Moreover, the differential limiting force varies in accordance with the input torque. Accordingly, the above-mentioned planetary gear apparatus substantially has a toque sensitive differential limiting mechanism.

However, the conventional planetary gear apparatus having such a differential limiting mechanism is encountered with a problem in which a torque bias ratio, this being a ratio between the rotation torque transmitted to the inner gear and the rotation torque transmitted to the sun gear at the time of differential rotation, fluctuates extensively.

That is, in the conventional differential gear apparatus, the teeth of the inner gear, the sun gear and the planetary gear are helical teeth so that a friction torque acts on the respective end faces of the inner gear, the sun gear and the planetary gear. Owing to the helical teeth, the places where the planetary gear is engaged with the inner gear and the sun gear are axially shifted in accordance with the rotation of the planetary gear, cyclically. When the engaging place is located on one end side of the planetary gear, the planetary gear is slanted toward one side with respect to the axis of the receiving hole by the engaging reaction between the planetary gear and the inner gear and sun gear. When the engaging place is located at the central part in the axial direction of the planetary gear, the planetary gear is in parallel with the axis of the receiving hole. When the engaging place is located on the other end side of the planetary gear, the planetary gear is slanted toward the other side with respect to the axis of the receiving hole. As the slanting state of the planetary gear changes, the contact pressure between the outer peripheral surface of the planetary gear and the inner peripheral surface of the receiving hole varies in accordance with the engaging cycle (=360 degrees/number of teeth of the planetary gear) of the planetary gear. As a result, the friction torque acting on the planetary gear cyclically fluctuates.

Figure 8:
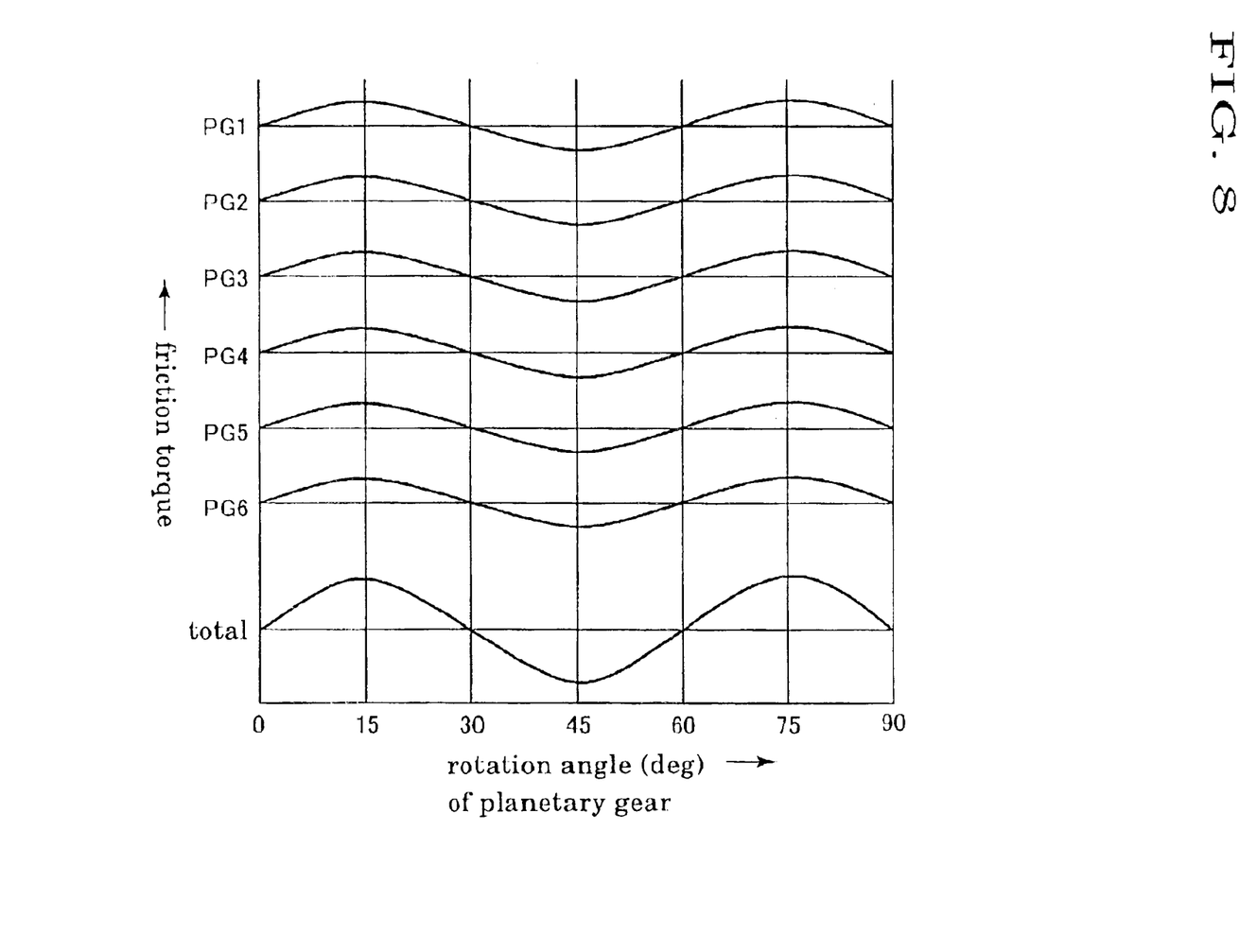
FIG. 8 is a view showing the fluctuation of friction torque in the conventional planetary gear apparatus.

If the number of planetary gears is only one, the problem is not very serious because the amount of variation of the friction torque is comparatively small. However, the planetary gear apparatus normally includes a plurality of planetary gears. Presuming that the number of planetary gears is six and that the friction torque of each planetary gear varies in a range of from 0 to 2, the friction torque of the six planetary gears, as a whole, varies in a range from 0 to 12 as shown in FIG. 8. Because, in the conventional planetary gear apparatus, the friction torque of each planetary gear varies at the same phase, the variation of friction torque of each planetary gear is accumulated. This means that the range of fluctuation is so large as 6 times, that is, the range of fluctuation becomes so large as the normal range multiplied by the number of planetary gears. As a result, the torque bias ratio fluctuates extensively. This could be the cause of noises and vibrations.

SUMMARY OF THE INVENTION

The present invention has been made in order to solve the above problems. According to the present invention, there is provided a planetary gear apparatus comprising an inner gear and a sun gear whose axes are aligned with a rotation axis, a carrier rotatably disposed about the rotation axis and having a plurality of receiving holes formed on a circumference about the rotation axis and extending in parallel with the rotation axis, and a plurality of planetary gears rotatably received in the receiving holes of the carrier and engaged with the inner gear and the sun gear, the inner gear, the sun gear and the planetary gears including helical teeth, an engaging phase of at least one of the planetary gears with respect to the inner gear and the sun gear being different from the engaging phases of the remaining planetary gears with respect to the inner gear and the sun gear.

In this case, it is also accepted that the numbers of teeth of the inner gear and the sun gear which are located between mutually adjacent two planetary gears in the peripheral direction about the rotation axis are set to a value having a fraction below the decimal point, so that engaging phases of adjacent two planetary gears in the peripheral direction with respect to the inner gear and the sun gear are mutually different. Particularly, it is preferred that the planetary gears are arranged at equal intervals in the peripheral direction, and the installation number of the planetary gears is set to a value which is different from a divisor of the numbers of teeth of the inner gear and the sun gear so that the numbers of teeth of the inner gear and the sun gear located between the adjacent two planetary gears in the peripheral direction become a value having a fraction below the decimal point.

It is also accepted that the installation number and the numbers of teeth of the planetary gears are set to a value which is an divisor of the numbers of teeth of the inner gear and the sun gear, and at least one of the planetary gears is arranged at a different interval in the peripheral direction from the remaining planetary gears so that an engaging phase of the at least one of the planetary gear with respect to the inner gear and the sun gear is different from the engaging phases of the remaining planetary gears with respect to the inner gear and the sun gear.

DETAILED DESCRIPTION OF THE INVENTION

The embodiments of the present invention will be described hereinafter with reference to FIGS. 1 through 7.

Figure 1:
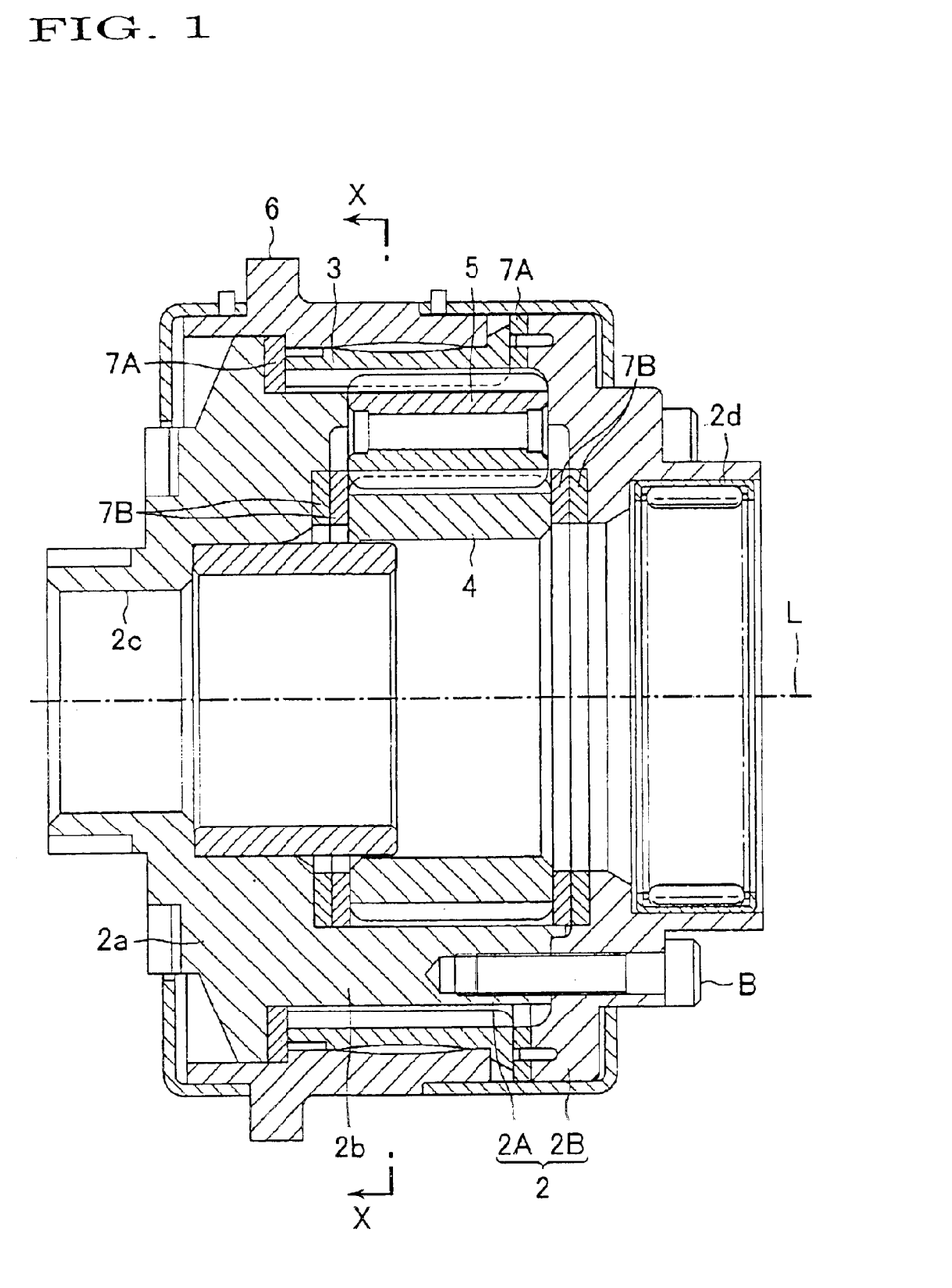
FIG. 1 is a vertical sectional view showing the first embodiment of the present invention.
Figure 2:
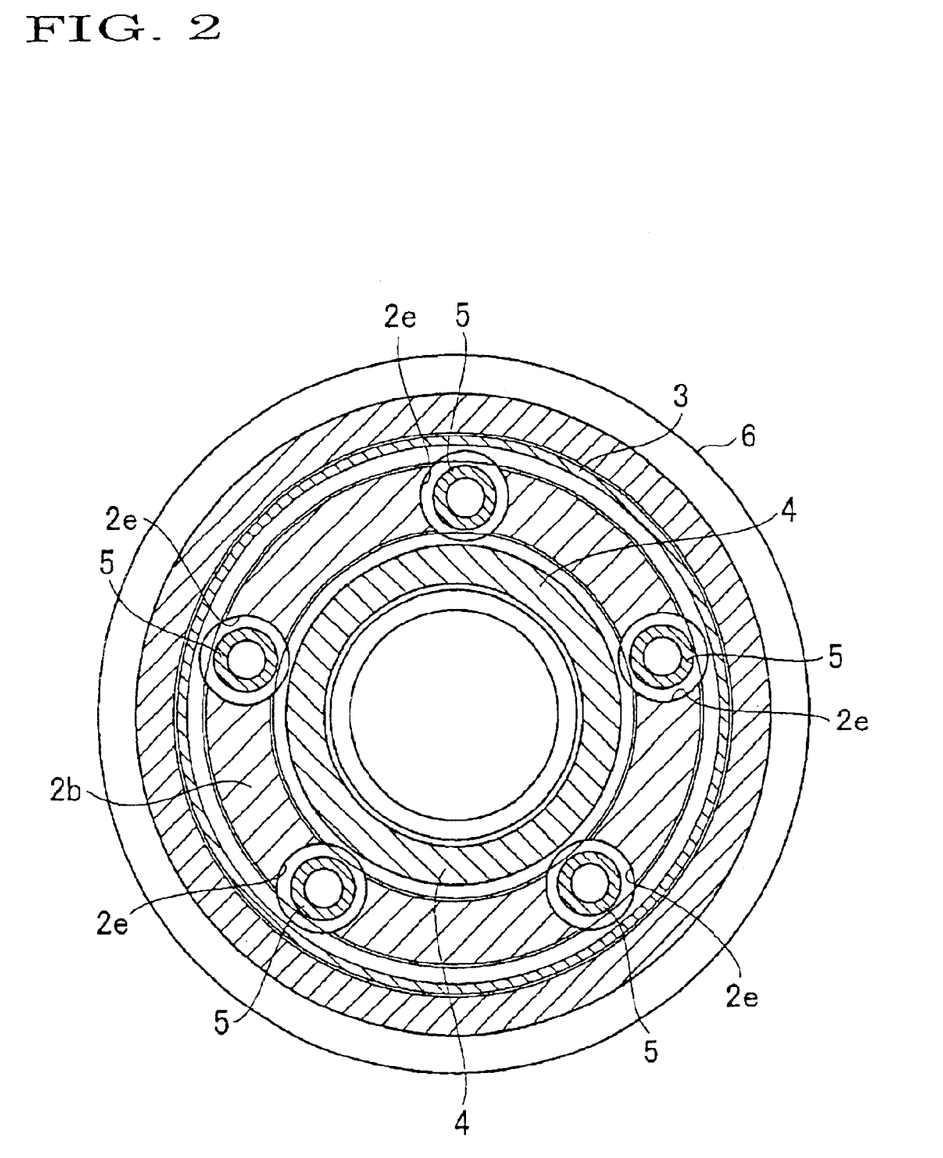
FIG. 2 is a sectional view taken on line X—X of FIG. 1.

FIGS. 1 and 2 show one embodiment of the present invention. A planetary gear apparatus 1 shown in those Figures chiefly comprises a housing (carrier) 2, an inner gear 3, a sun gear 4 and planetary gears 5.

The housing 2 is composed of a pair of half bodies 2A, 2B which are arranged in opposing relation. One half body 2A (left half body in FIG. 1) includes a disc-shaped main body portion 2a and a circular cylindrical portion 2b integrally formed on an opposing surface of the main body portion 2a with respect to the half body 2B. A through-hole 2c is formed in the central part of the main body portion 2a. The through-hole 2c is coaxial with the circular cylindrical portion 2b. The other half body 2B is in the shape of a disc and is fixed to a distal end face of the circular cylindrical portion 2b by bolts B. A through-hole 2d is formed in the central part of the half body 2B such that the axis of the through-hole 2d is aligned with that of the through-hole 2c. The half bodies 2A, 2B are arranged such that the axes of the through-holes 2c, 2d are aligned with the rotation axis L of the planetary gear apparatus 1.

One end of a cylindrical member 6 having a circular shape in section is rotatably supported on the outer peripheral surface of the housing 2. The inner gear 3 is connected, by spline fitting or the like, to the inner peripheral surface of the cylindrical member 6 opposing the circular cylindrical portion 2b such that the inner gear 3 is non-rotatable but movable in the direction of the rotation axis L. Accordingly, the inner gear 3 is supported on the housing 2 such that the inner gear 3 is rotatable about the rotation axis L and movable in the direction of the rotation axis L. The inner gear 3 has helical teeth. The inside diameter of the inner gear 3 is dimensioned to be slightly larger than the outside diameter of the circular cylindrical portion 2b. The respective end faces of the inner gear 3 are contacted with the half bodies 2A, 2B, respectively, through washers 7A.

The sun gear 4 is rotatably disposed at the inner side of the circular cylindrical portion 2b with its axis aligned with the rotation axis L. The outside diameter of the sun gear 4 dimensioned to be slightly smaller than the inside diameter of the circular cylindrical portion 2b. The respective end faces of the sun gear 4 are contacted with the half bodies 2A, 2B, respectively, through washers 7B.

A plurality of receiving holes 2e are formed in the circular cylindrical portion 2b. Those receiving holes 2e extend from the distal end face (the end face on the side of the half body 2B) of the circular cylindrical portion 2b toward the main body portion 2a side in parallel with the rotation axis L. Although five receiving holes are formed in this embodiment, they may be three, four, or six or more. The receiving holes 2e are arranged in the peripheral direction of the circular cylindrical portion 2b at equal intervals. In other words, the receiving holes 2e are arranged on a circumference about the rotation axis L at equal intervals. The inside diameter of each receiving hole 2e is dimensioned to be larger than the thickness (=the outside diameter of the circular cylindrical portion 2b—the inside diameter of the circular cylindrical portion 2b) of the circular cylindrical portion 2b. Moreover, the axis of the receiving hole 2e is disposed at the center of the outer peripheral surface and inner peripheral surface of the circular cylindrical portion 2b. Accordingly, one side part of the receiving hole 2e on the radially outer side of the circular cylindrical portion 2b is open to the outside from the outer peripheral surface of the circular cylindrical portion 2b, and the other side part of the receiving hole 2e on the radially inner side of the circular cylindrical portion 2b is open to the outside from the inner peripheral surface of the circular cylindrical portion 2b.

Each receiving hole 2e receives therein the corresponding planetary gear 5. Accordingly, the respective planetary gears 5 are arranged at equal intervals on a circumference about the rotation axis L in the same manner as the receiving holes 2e. Each planetary gear 5 has a generally same outside diameter as the inner diameter of the receiving hole 2e and is rotatably (on its own axis) inserted in the receiving hole 2e. Moreover, since the outside diameter of the planetary gear 5 is generally same as the inside diameter of the receiving hole 2e, two parts of the outer peripheral portion of the planetary gear 5 project to the outside from one and the other side portions of the receiving hole 2e, respectively. That is, the outer peripheral portion of each planetary gear 5 projects to the outside from the outer and inner peripheral surfaces of the circular cylindrical portion 2b. The planetary gear 5 is engaged at its projecting part from the outer peripheral surface of the circular cylindrical portion 2b with the inner gear 3 and at its projecting part from the inner peripheral surface of the circular cylindrical portion 2b with the sun gear 4. As apparent from the fact that the planetary gears 5 are in engagement with the inner gear 3 and the sun gear 4, the planetary gears 5 and the sun gear 4 each include a same helical angle as the inner gear 3. The inner gear 3 and the planetary gears 5 are same in helical direction but the planetary gears 5 and the sun gear 4 are opposite in helical direction.

Since the inner gear 3, the sun gear 4 and the planetary gears 5 constitute the planetary gear mechanism, the numbers of teeth N1, N2 and N3 are selectively set to satisfy the following relation;

$$N1=N2+2N3$$

where N1, N2 and N3 represent the numbers of teeth of the gears 3, 4 5, respectively. In this embodiment, the numbers of teeth N1, N2 and N3 are selectively set to 36, 24 and 6, respectively.

With the above-mentioned construction, when one of the housing 2, the inner gear 3 and the sun gear 4 is driven for rotation, the rotation is transmitted to the other two through the planetary gears 5. The rotation transmitted to the other two is extracted as an output rotation. In case the planetary gear apparatus 1 is used for a vehicle, for example, two output rotations are transmitted to the two front or rear wheels, or otherwise to the two front or rear differential gears. In the description to follow, it is presumed for the convenience of explanation that the housing 2 is driven for rotation.

When the planetary gears 5 are rotated on their own axes to differentially rotate the inner gear 3 and the sun gear 4 at the time of rotational driving of the housing 2, the outer peripheral surface of the planetary gear 5 is press contacted with the inner peripheral surface of the receiving hole 2e by the engaging reaction between the planetary gear 5 and the inner gear 3 and sun gear 4. As a result, a friction resistance is generated between the outer peripheral surface of the planetary gear 5 and the inner peripheral surface of the receiving hole 2e. Moreover, one end face of the inner gear 3 is pushed against the half body 2A or 2B through the washer 7A by the thrust force generated between the inner gear 3 and the planetary gears 5, and one end face of the sun gear 4 is pushed against the half body 2A or 2B through the washer 7B by the thrust force generated between the sun gear 4 and the planetary gears 5. One end face of the planetary gear 5 is pushed against the bottom surface of the receiving hole 2e or the half body 2B. A friction resistance is generated between the respective push contacting surfaces. The differential rotation between the inner gear 3 and the sun gear 4 is limited by the friction torque attributable to the friction resistances. Which end faces of the gears 3, 4 and 5 are contacted with other members such as the half body 7A depends on the helical direction of the gears 3, 4 and 5 and the rotating direction of the housing 2.

Presuming that the engaging phases of the five planetary gears 5 with respect to the inner gear 3 and the sun gear 4 are mutually same, the friction torque acting between the outer peripheral surface of each planetary gear 5 and the inner peripheral surface of each receiving hole 2e fluctuates at the same cycle (=360 degrees/N3) as previously mentioned. As a result, such an inconvenience occurs that the torque bias ratio fluctuates extensively.

In order to overcome the above inconvenience, under the conditions that the planetary gears 5 are arranged at equal intervals in the peripheral direction, the planetary gear apparatus 1 adopts a value different from the divisor of the numbers of teeth N1, N2 of the inner gear 3 and the sun gear 4 as the installation number n of the planetary gears 5. In the planetary gear apparatus 1 according to this embodiment, N1=36, N2=24, n=5 are adopted as previously mentioned. The installation number n is a value different from the divisor of the numbers of teeth N1, N2. Under such conditions, the engaging phases of the respective planetary gears 5 with respect to the inner gear 3 and the sun gear 4 can be mutually different. In this respect, the engaging phases of the respective planetary gears 5 with respect to the inner gear 3 will be described hereinafter first.

The engaging phases of the planetary gears 5 with respect to the inner gear 3 fluctuate at the cycle of (360 degrees/N3). On the other hand, if the number of teeth of the inner gear 3 located between adjacent two planetary gears 5, 5 in the peripheral direction is represented by T1, the engaging phases of the adjacent two planetary gears 5, 5 in the peripheral direction with respect to the inner gear 3 are different by (360 degrees/N3)×T1. If the number of teeth T1 is an integer, the engaging phase difference of the adjacent two planetary gears 5, 5 with respect to the inner gear 3 become an integral multiple of the cycle (360 degrees/N3). Therefore, the engaging phases of the adjacent two planetary gears 5, 5 with respect to the inner gear 3 become substantially same. In other words, if the number of teeth T1 is a value having a fraction below the decimal point, the engaging phase difference (360 degrees/N3)×T1 between the adjacent two planetary gears 5, 5 and the inner gear 3 does not become an integral multiple of the cycle of the engaging phase of the planetary gear 5. Therefore, the engaging phases of the adjacent two planetary gears 5, 5 with respect to the inner gear 3 become mutually different. As the engaging phases are mutually different, the friction torque acting on the outer periphery of each planetary gear is not added to each other. Therefore, the fluctuation range of the friction torque acting on the entire planetary gears can be reduced.

The above will be described with concrete values. In the planetary gear apparatus 1 according to this embodiment, since 5 is adopted as the installation number n of the planetary gears 5 and those planetary gears 5 are arranged at equal intervals in the peripheral direction, the number of teeth T1 of the inner gear 3 located between the adjacent two planetary gears 5, 5 in the peripheral direction is as follows;

$$T1=N1/n=36/5=7.2$$

Therefore, the engaging phase difference of the adjacent two planetary gears 5, 5 in the peripheral direction with respect to the inner gear 3 is as follows;

$$(360\ \text{degrees}/N3) \times T1 = 432\ \text{degrees}.$$

Since the engaging phases of the planetary gears 5 are at the cycle of 60 degrees (=360 degrees/N3), the following expression can be obtained;

$$432 - 60\ \text{degrees} \times 7 = 12\ \text{degrees}$$

That is, the engaging phase difference of the adjacent two planetary gears 5, 5 in the peripheral direction with respect to the inner gear 3 is substantially 12 degrees.

Although the above description is made with respect to the engaging phase difference of the planetary gears 5 with respect to the inner gear 3, it can likewise be applicable to the engaging phase difference of the planetary gears 5 with respect to the sun gear 4. That is, if the number of teeth of the sun gear 4 located between the adjacent two planetary gears 5, 5 in the peripheral direction is represented by T2, the following equation can be obtained;

$$T2=N2/n=24/5=4.8$$

Therefore, the phase difference of the adjacent two planetary gears 5, 5 in the peripheral direction is as follows;

$$(360\ \text{degrees}/N3) \times T2 = 288\ \text{degrees}$$

Since the engaging phases of the planetary gears 5 are at the cycle of 60 degrees, the following expression can be obtained;

$$288\ \text{degrees} - 60\ \text{degrees} \times 5 = -12\ \text{degrees}$$

Therefore, the phase difference of the two planetary gears 5, 5 with respect to the inner gear 3 is 12 degrees.

The interval (center angle) between the adjacent planetary gears 5, 5 in the peripheral direction must be selectively set so that it becomes an integral multiple of m, if the following equation is established.

$$m=360\ \text{degrees}/(N1+N2)$$

In this embodiment, since N1=36 and N2=24, m=6 degrees and the center angle between the adjacent planetary gears 5, 5 is (360)/n=72 degrees. Since this is 12-fold of m=6 degrees and thus an integral multiple of m=6 degrees. Therefore, the planetary gear apparatus 1 according to this embodiment satisfies the above-mentioned conditions. The requirement for satisfying the above-mentioned conditions is likewise applicable to the embodiment to be described hereinafter.

Figure 3:
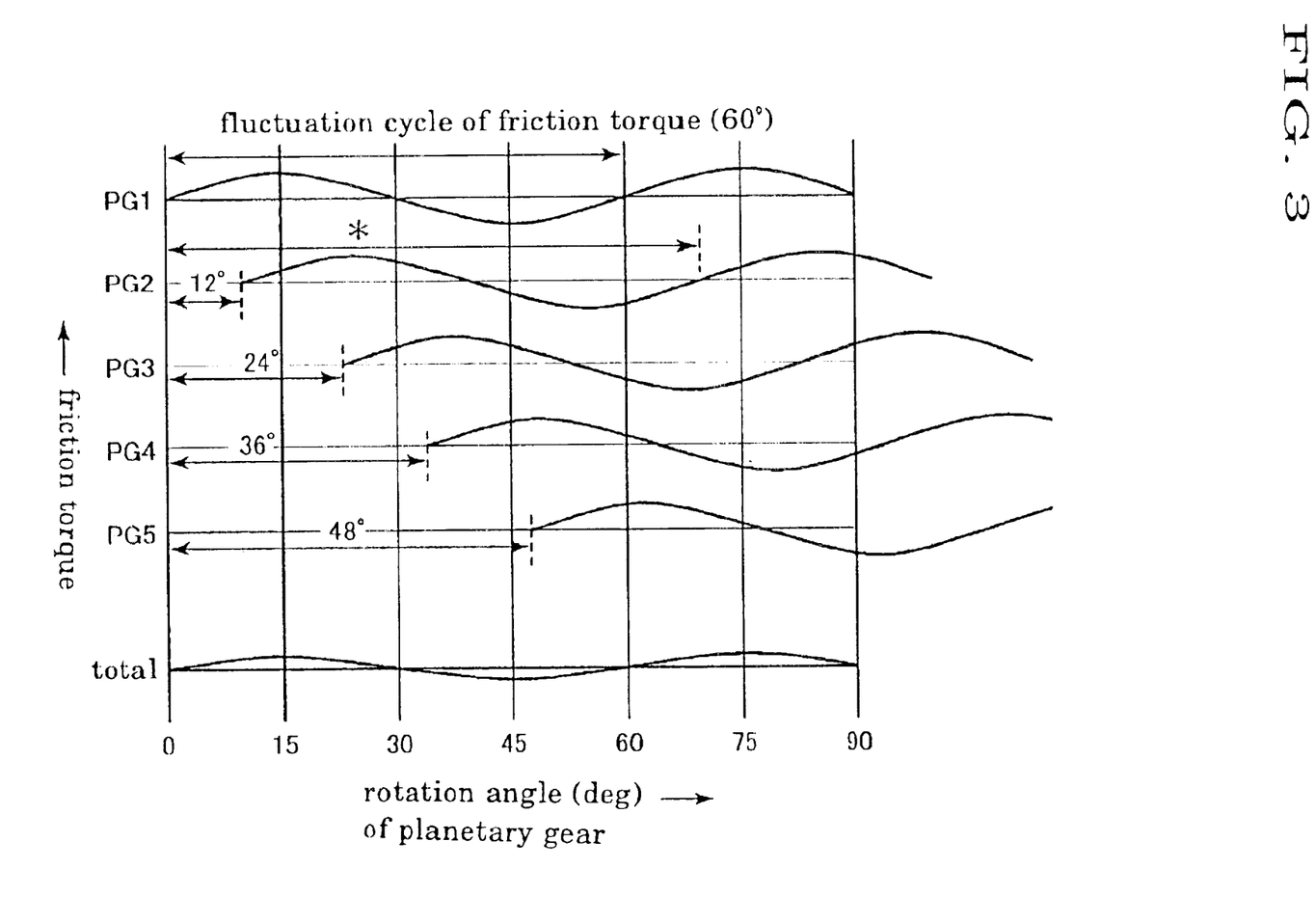
FIG. 3 is a view showing the fluctuation of friction torque in the embodiment shown in FIGS. 1 and 2.

FIG. 3 is a chart showing the fluctuation of friction torque to the respective planetary gears PG1 through PG5 where PG1 represents a reference planetary gear arbitrarily selected from the five planetary gears 5, and PG2, PG3, . . . represent the planetary gears 5, respectively, which are sequentially arranged in the peripheral direction from this reference planetary gear PG1, as well as the fluctuation of friction torque of the entire planetary gears PG1 through PG5. The friction torque acting on the planetary gears PG1 through PG5 cyclically fluctuates serving 60 degrees as one cycle. However, since the phases of the respective planetary gears PG1 through PG5 are shifted by 12 degrees each, the friction torques acting on the respective planetary gears PG1 through PG5 are averaged and so, the fluctuation of friction torque acting on the entire planetary gears PG1 through PG5 becomes zero theoretically. Actually, however, the fluctuation of friction torque never becomes zero due to manufacturing errors, etc. Instead, the fluctuation of friction torque becomes very small. Accordingly, in this planetary gear apparatus 1, the fluctuation of torque bias ratio can be suppressed to small. This makes it possible to reduce noises and vibrations extensively.

Another embodiment of the present invention will now be described hereinafter. In the embodiment to be described hereinafter, only those constructions which are different from the above embodiment will be described and like construction is represented by like reference and description thereof is omitted.

Figure 4:
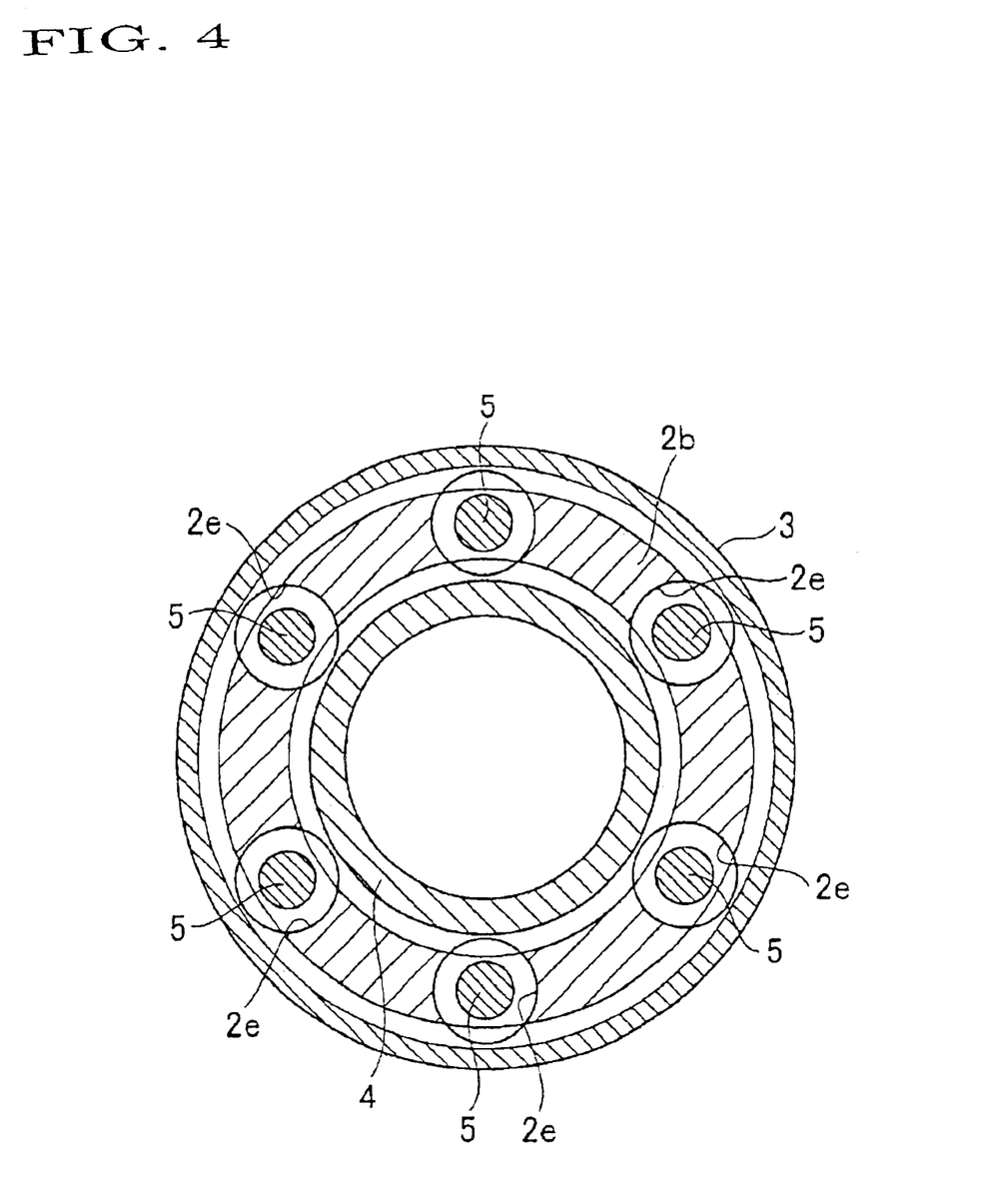
FIG. 4 is a sectional view, like FIG. 2, showing an essential part of the second embodiment of the present invention.

FIG. 4 shows a second embodiment of the present invention. In this embodiment, the number of teeth N3 of each planetary gear 5 is seven, the installation number n of the planetary gears 5 is six. On the other hand, the numbers of teeth N1, N2 of the inner gear 3 and the sun gear 4 are N1=37 and N2=23, respectively which satisfy the following expression;

$$N1=N2+2\cdot N3$$

As apparent from the above, in this embodiment, the number of teeth N3 of each planetary gear 5 is a value which is different from the divisor of the numbers of teeth N1, N2 of the inner gear 3 and the sun gear 4.

In this embodiment adopting the above-mentioned numbers of teeth N1, N2 and N3 and the above-mentioned installation number n, the numbers of teeth T1, T2 of the inner gear 3 and the sun gear 4 located between the adjacent two planetary gears 5, 5 in the peripheral direction are, respectively, as follows;

$$T1=37/6\approx 6.2$$

$$T2=23/6\approx 3.8$$

The numbers of teeth T1, T2 are not the integer. Instead, they are values each having a fraction below the decimal point. Thus, also in this embodiment, the engaging phases of the respective planetary gears 5 with respect to the inner gear 3 and the sun gear 4 can be made mutually different. The foregoing will be described with concrete values hereinafter.

Since the numbers of teeth of the planetary gears are 7, the engaging cycle (fluctuation cycle of friction torque) of each planetary gear 5 with respect to the inner gear 3 and the sun gear 4 are as follows;

$$360/7\approx 51.4 \text{ degrees}$$

On the other hand, the engaging phase difference of the adjacent two planetary gears 5, 5 in the peripheral direction with respect to the inner gear 3 and the sun gear 4 are, respectively, as follows;

$$(360 \text{ degrees}/7)\times T1\approx 317.1 \text{ degrees}$$

$$(360 \text{ degrees}/7)\times T2\approx 197.1 \text{ degrees}$$

Since the engaging cycle of the planetary gears 5 is 51.4 degrees, the following expressions can be obtained.

$$317.1-51.4\times 6=8.6 \text{ degrees}$$

$$197.1-51.4\times 4=8.7 \text{ degrees}$$

Therefore, the engaging difference of the adjacent two planetary gears in the peripheral direction with respect to the inner gear 3 and the sun gear 4 is approximately 8.6 degrees. The difference between this 8.6 and 8.7 is in the range of errors occurrable when rounding a given value to two decimal places.

Figure 5:
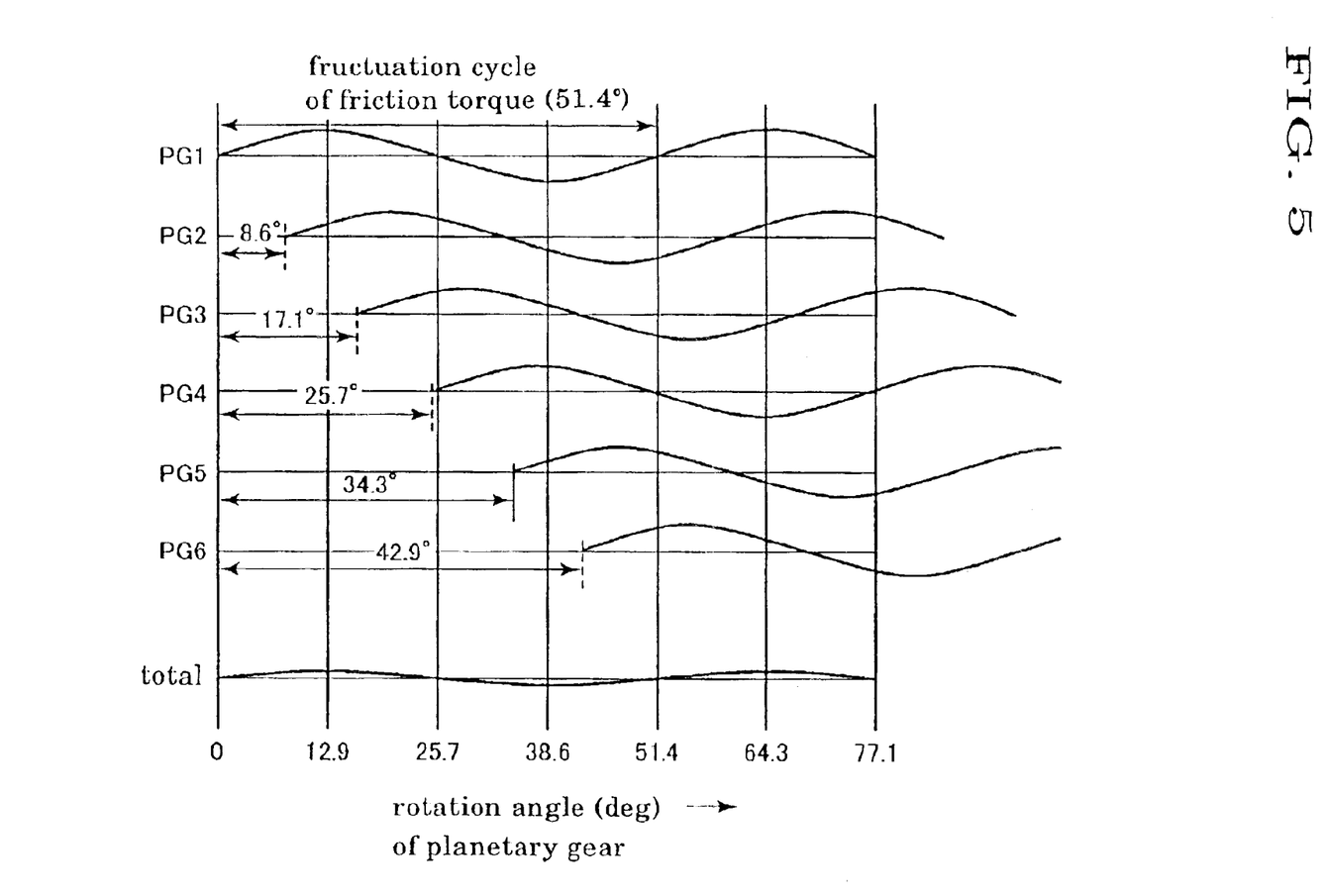
FIG. 5 is a view showing the fluctuation of friction torque in the embodiment shown in FIG. 4.

FIG. 5 is a chart showing the fluctuation of friction torque to the respective planetary gears PG1 through PG6 where PG1 represents a reference planetary gear 5, and PG2, PG3, . . . represent the planetary gears 5, respectively, which are sequentially arranged in the peripheral direction from this reference planetary gear PG1, as well as the fluctuation of friction torque of the entire planetary gears PG1 through PG6. Also in this embodiment, since the friction torques acting on the respective planetary gears PG1 through PG6 are averaged, the fluctuation of friction torque acting on the entire planetary gears PG1 through PG6 becomes zero theoretically.

Figure 6:
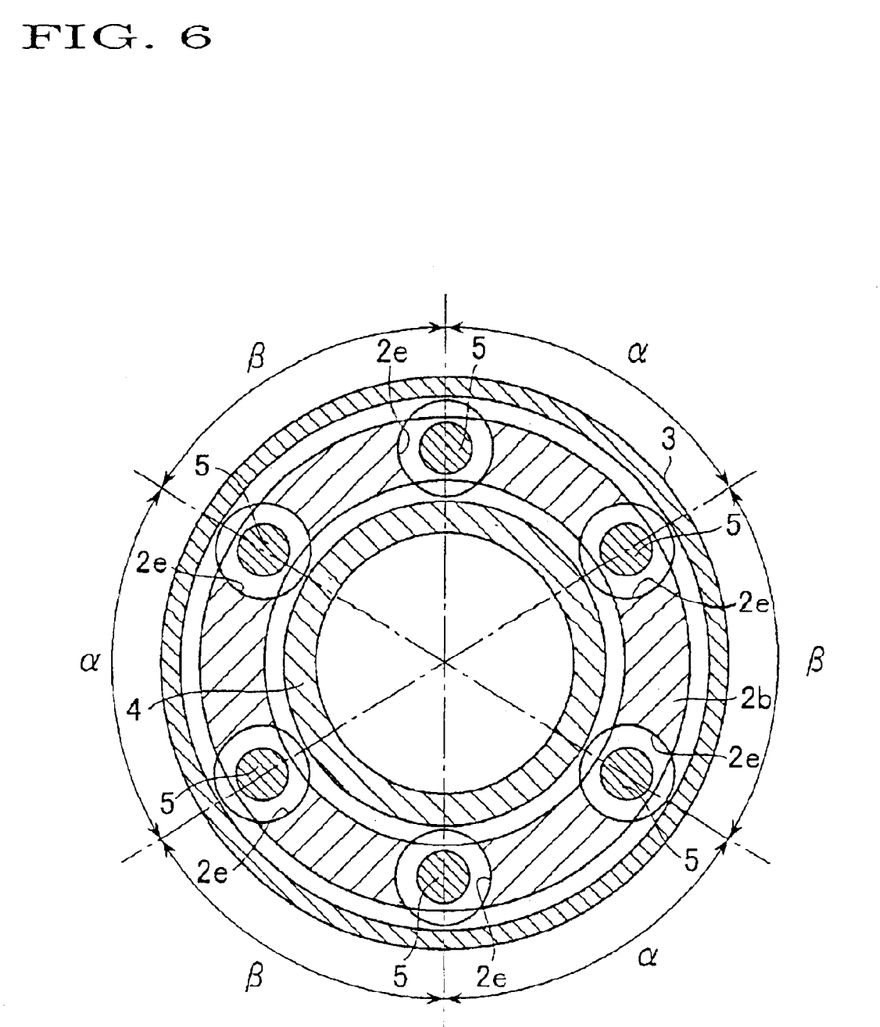
FIG. 6 is a sectional view, like FIG. 2, showing the third embodiment of the present invention.

FIG. 6 shows the third embodiment of the present invention. In this embodiment, the numbers of teeth N1, N2 and N3 of the inner gear 3, the sun gear 4 and the planetary gears 5 are 36, 24 and 6, respectively, and the installation number n of the planetary gears 5 is 6. That is, any of the number of teeth N3 and the installation number n of the planetary gear 5 is the divisor of the numbers of teeth N1, N2 of the inner gear 3 and the sun gear 4. However, in this embodiment, the intervals (center angle) at which the respective planetary gears 5 are sequentially arranged in the peripheral direction from the reference planetary gear 5 are alternately mutually different, one being an angle α and the other an angle β. The angles α and β are established by the following expression:

$$\alpha=(360 \text{ degrees}/n)+k\cdot 360 \text{ degrees}/(N1+N2)$$

$$\beta=(360 \text{ degrees}/n)-k\cdot 360 \text{ degrees}/(N1+N2)$$

where k is a positive integer.

In a differential gear apparatus constructed in the manner as mentioned above, since the following expression is satisfied;

$$\alpha+\beta=(360 \text{ degrees}/n)\times 2$$

the engaging phases of the planetary gears PG3 and PG5 are same as the engaging phase of the reference planetary gear PG1. On the other hand, the number of teeth T of the inner gear 3 located between the reference planetary gear PG1 and the planetary gear PG2, between PG3 and PG4, and between PG5 and PG6 is as follows;

$$T=(\alpha/360 \text{ degrees})\times N1$$

in which the integer k is selectively set such that the number of teeth T has a fraction below the decimal point. Therefore, in this embodiment, the engaging phases of the planetary gears PG2, PG3, PG5 with respect to the inner gear 3 and the sun gear 4 can be different from the engaging phases of the planetary gears PG1, PG3, PG5 with respect to the inner gear 3 and the sun gear 4.

The above will be described hereinafter with concrete values. In this embodiment, k=1 is adopted. Therefore, the center angles between the planetary gears PG1, PG3, PG5 and the adjacent planetary gears PG2, PG4, PG 6 are all 66 degrees. The numbers of teeth of the inner gear 3 and the sun gear 4 corresponding to those center angles are 6.6, and 4.4, respectively, which have a fraction below the decimal point. Therefore, the engaging phases of the planetary gears PG2, 6PG4, PG with respect to the inner gear 3 and the sun gear 4 are different from the engaging phases of the adjacent planetary gears PG1, PG3, PG5 in the peripheral direction with respect to the inner gear 3 and the sun gear 4. The engaging phases of the planetary gears PG2, PG4, PG6 corresponding to the numbers of teeth 6.6 and 4.4 are as follows;

$$(360 \text{ degrees}/N3)\times 6.6 = 396 \text{ degrees}$$

$$(360 \text{ degrees}/N3)\times 4.4 = 264 \text{ degrees}$$

Since the engaging cycle of the planetary gears 5 is as follows;

$$360/6 = 60 \text{ degrees}$$

the following expressions can be obtained.

$$396 \text{ degrees} - 60\times 6 = 36 \text{ degrees}$$

$$264 \text{ degrees} - 60\times 5 = -36 \text{ degrees}$$

That is, the engaging phases of the planetary gears PG2, PG4, PG6 with respect to the inner gear 3 and the sun gear 4 are different by 36 degrees in phase with respect to the engaging phases of the planetary gears PG1, PG3, PG5 with respect to the inner gear 3 and the sun gear 4.

Figure 7:
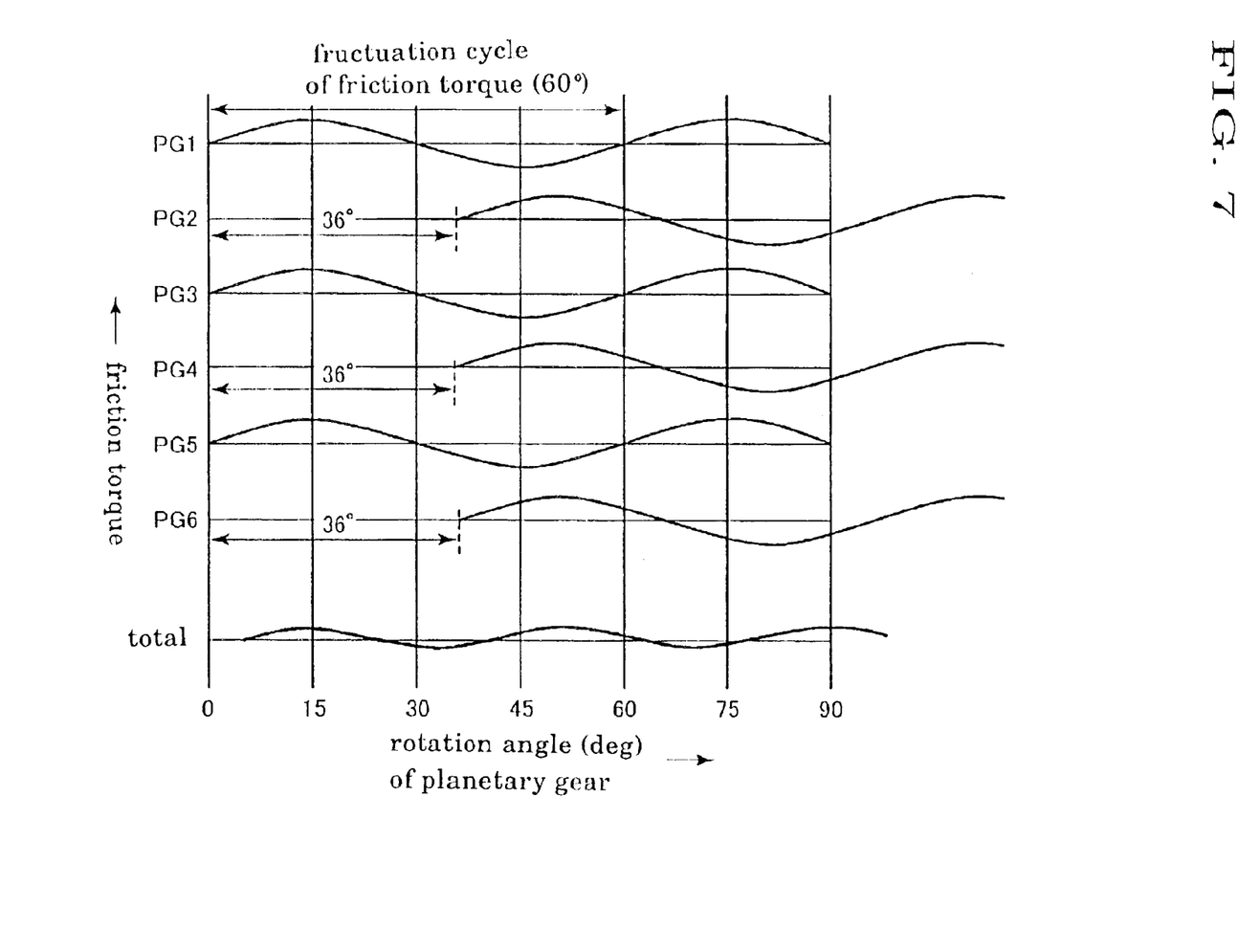
FIG. 7 is a view showing the fluctuation of friction torque in the embodiment shown in FIG. 6.

FIG. 7 is a chart showing the friction torque acting on the outer peripheries of the respective planetary gears PG1 through PG6 in this embodiment. In this embodiment, since the six planetary gears 5 are merely divided into two groups, one group consisting of PG1, PG3 and PG5 which have the same engaging phase as the reference planetary gear PG1 and the other group consisting of PG2, PG4 and PG6 which have an engaging phase different by 36 degrees with respect to the reference planetary gear 5, the fluctuation of friction torque cannot be made zero unlike in the above-mentioned two embodiments. As apparent from FIG. 7, however, the range of fluctuation of the total friction torques of the entire planetary gears 5 becomes 4 or less. Thus, the fluctuation of friction torque can be reduced extensively compared with the range of fluctuation 12 of the conventional planetary gear apparatus.

It should be noted that the present invention is not limited to the above embodiments but that many changes and modifications can be made in accordance with necessity.

For example, in the above embodiments, although the housing 2 is commonly used as a carrier having the receiving holes for rotatably receiving therein the planetary gears 5, it is also accepted that the housing 2 is separately formed from the carrier and the carrier is rotatably arranged within the housing 2 for rotation about the rotation axis L.

Moreover, in the first two embodiments mentioned above, although the installation number n of the planetary gears 5 are a value which is smaller than the number of teeth N3, it may be a value larger than the number of teeth N3.

What is claimed is:

1. A planetary gear apparatus comprising an inner gear and a sun gear whose axes are aligned with a rotation axis, a carrier rotatably disposed about said rotation axis and having a plurality of receiving holes formed on a circumference about said rotation axis and extending in parallel with said rotation axis, and a plurality of planetary gears rotatably received in said receiving holes of said carrier and engaged with said inner gear and said sun gear, said inner gear, said sun gear and said planetary gears including helical teeth, an engaging phase of at least one of said planetary gears with respect to said inner gear and said sun gear being different from the engaging phases of the remaining planetary gears with respect to said inner gear and said sun gear.

2. A planetary gear apparatus according to claim 1, wherein the numbers of teeth of said inner gear and said sun gear which are located between mutually adjacent two planetary gears in the peripheral direction about said rotation axis are set to a value having a fraction below the decimal point, so that engaging phases of adjacent two planetary gears in the peripheral direction with respect to said inner gear and said sun gear are mutually different.

3. A planetary gear apparatus according to claim 2, wherein said planetary gears are arranged at equal intervals in the peripheral direction, and the installation number of said planetary gears is set to a value which is different from a divisor of the numbers of teeth of said inner gear and said sun gear so that the numbers of teeth of said inner gear and said sun gear located between the adjacent two planetary gears in the peripheral direction become a value having a fraction below the decimal point.

4. A planetary gear apparatus according to claim 1, wherein the installation number and the numbers of teeth of said planetary gears are set to a value which is an divisor of the numbers of teeth of said inner gear and said sun gear, and at least one of said planetary gears is arranged at a different interval in the peripheral direction from the remaining planetary gears so that an engaging phase of said at least one of said planetary gear with respect to said inner gear and said sun gear is different from the engaging phases of the remaining planetary gears with respect to said inner gear and said sun gear.

* * * * *